United States Patent
Martin et al.

[15] 3,658,097
[45] Apr. 25, 1972

[54] CORRUGATED TUBING

[72] Inventors: Ronald C. Martin, Waterville, Ohio; Marty E. Sixt, Iowa City, Iowa

[73] Assignee: Advanced Drainage Systems, Inc., Waterville, Ohio

[22] Filed: Jan. 28, 1970

[21] Appl. No.: 6,413

[52] U.S. Cl..............................................138/121, 138/178
[51] Int. Cl.......................................................F16l 11/12
[58] Field of Search..............................138/121, 178; 61/11

[56] References Cited

UNITED STATES PATENTS 3,461,531  8/1969  De Gain.............................138/173 X

FOREIGN PATENTS OR APPLICATIONS 760,672  6/1967  Canada...................................138/178
804,399  1/1969  Canada...................................138/178
226,804  6/1969  Sweden...................................138/178
498,385  1/1939  Great Britain..........................138/135

*Primary Examiner*—Herbert F. Ross
*Attorney*—Connolly & Hutz

[57] ABSTRACT

Flexible corrugated tube has alternating flat annular peaks and flat annular valleys with walls interconnecting the peaks and valleys. Recesses are provided in selected peak portions and each recess has bottom contiguous with valleys on opposite sides of peak in which recess is located. Opening in recess provides communication between interior and exterior or flexible corrugated tube.

7 Claims, 3 Drawing Figures

PATENTED APR 25 1972    3,658,097

CORRUGATED TUBING

BACKGROUND OF THE INVENTION

The present invention relates to a flexible corrugated tube, and more particularly to subsurface flexible corrugated tubing for carrying fluids to or away from a particular underground location.

Prior to commercialization of endless flexible corrugated tubing, land improvement by providing proper drainage was an expensive and time-consuming operation. The red clay tile commonly used for drainage purposes required the piecing together of relatively short lengths to construct the desired drainage system. These systems were vulnerable to misalignment due to the large number of individual lengths that were required to construct them. Extreme care was required when the system of tiles was covered with earth in order to avoid breakage of the brittle tile material. Often, makeshift arrangements were used to seal the ends of a branch line which frequently caused the system to clog due to the inflow of silt and dirt. Flexible corrugated drainage tubing has eliminated the disadvantages which were characteristic of the prior systems. The continuous length and flexibility of corrugated tubing enable it to be easily and economically installed below grade. The corrugated configuration of the tubing enables it to withstand severe pressures without collapsing. Moreover, the material from which the tubing is fabricated is virtually non-destructible once it is installed below grade.

In ordinary drainage systems the openings provided in the tubing which in turn provide communication between the interior and exterior of the tubing for drainage purposes, may take a variety of different configurations. These openings may be in the form of circular perforations or slots made in the tubing by a cutting operation. For the most part, the only requirement is that a certain percentage of open area be provided as well as a maximum dimension for each opening to prevent foreign matter from entering into the tubing. However, flexible corrugated tubing lends itself to other applications wherein openings must meet certain standards and building code requirements. In several other applications for flexible corrugated tubing, the openings in the tubing must be quite large in comparison to the usual smaller openings in the more commonly used drainage tubing. Often, these larger openings must be greater in size than the width of one of the peaks or valleys forming the corrugations in the tubing. These larger openings therefore require positions on the tubing in which they may be located. The openings cannot simply be cut into a valley or peak portion since they would extend into the adjacent peaks and valleys of the tube.

Flexible corrugated tubing with large openings is required when a septic tank leach bed is installed. Most building codes require that the openings be at least one-half inch in diameter when tubing is used for this purpose. For strength, flexibility and other reasons the peaks and valleys of most corrugated tubing have a width less than one-half inch. Thus, it is necessary to provide corrugated tubing with special cleared-out portions through which the large openings may be formed or cut. Flexible tubing with large openings may also be utilized for drainage purposes in fields or around construction sites.

Accordingly, it is an object of the present invention to provide a flexible corrugated tube having large openings that enable fluids to flow from outside the tube into the interior of the tube or vice versa.

SUMMARY OF THE INVENTION

In accordance with the present invention a flexible corrugated tube has alternating substantially flat annular peak portions and substantially flat annular valley portions. Walls interconnect the peaks and valleys of the corrugated tube. At least one recess is located in one of the peak portions. Each recess has a bottom contiguous with the valley portions opposite the peak portion in which the recess is located. An opening in each recess provides communication between the interior and exterior of the corrugated tube.

Preferably, the opening in each recess may be circular. Moreover, the opening is usually dimensioned so that it extends into the valley portions opposite the peak portion having the recess. In many instances one annular peak portion of each group of a predetermined number of adjacent peak portions has a pair of spaced apart recesses. The recesses may be spaced apart by 120°.

BRIEF DESCRIPTION OF THE DRAWING

Novel features and advantages of the present invention in addition to those mentioned above will become apparent to one skilled in the art from a reading of the following detailed description in conjunction with the accompanying drawing wherein.

DETAILED DESCRIPTION OF THE INVENTION

Figure 1:
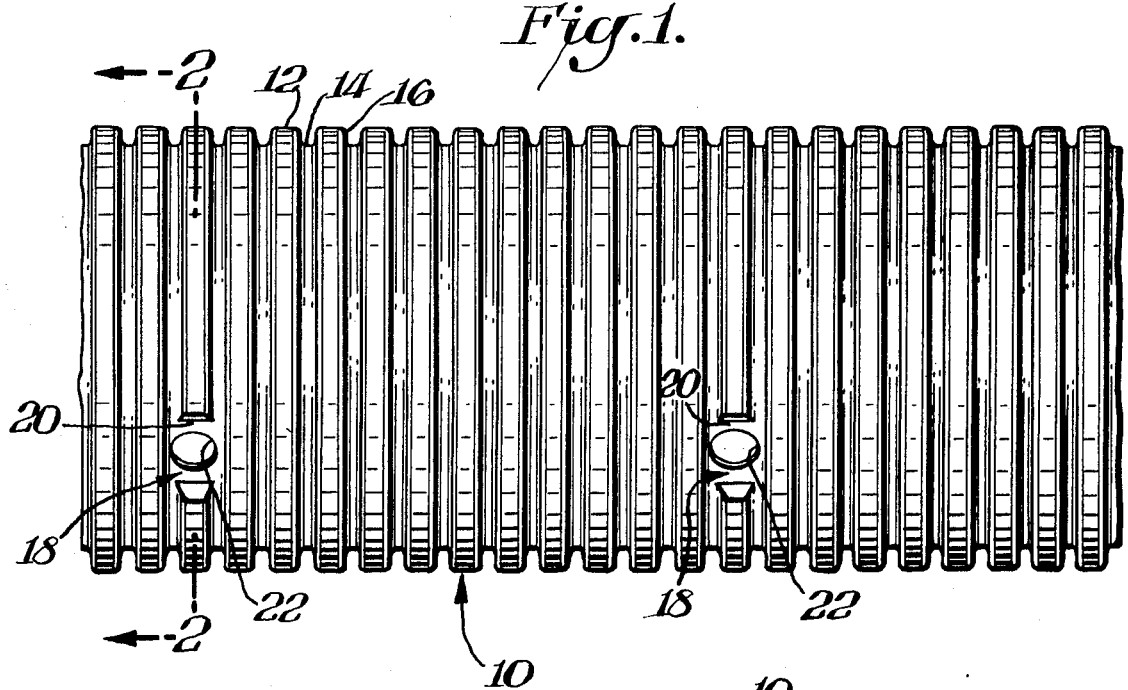
FIG. 1 is a side elevational view of a flexible corrugated tube according to the present invention.
Figure 2:
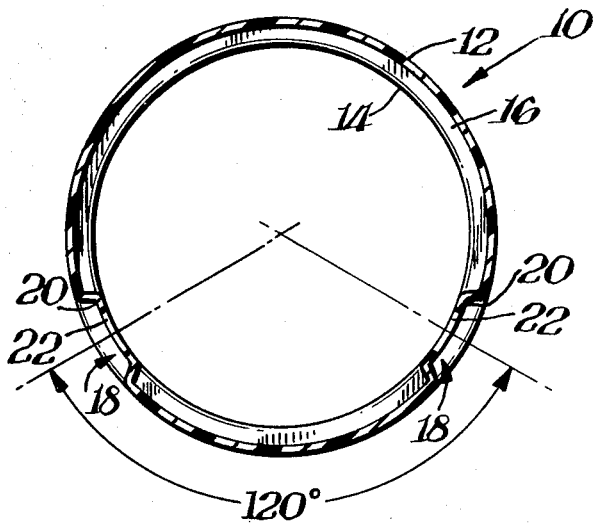
FIG. 2 is a sectional view taken along line 2—2 of FIG. 1.
Figure 3:
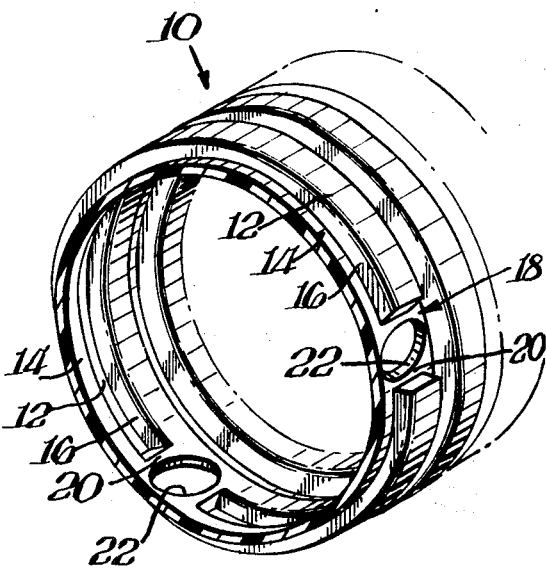
FIG. 3 is a perspective view of the corrugated tube illustrated in FIG. 1 showing interior and exterior details.

Referring in more particularity to the drawing, FIG. 1 illustrates a portion of an endless flexible corrugated tube 10 having alternating flat annular peaks 12 and flat annular valleys 14. Adjacent peaks and valleys are connected together by walls 16 disposed in planes perpendicular to the longitudinal axis of the tube. This particular configuration of corrugation provides unique strength and flexibility. Accordingly, when the tubing is installed below ground and covered with earth, the installation is an easy process owing to the flexibility of the tubing. Also, the strength of the tubing enables it to withstand the pressures after installation without collapsing. The tubing 10 is preferably fabricated of durable, high-strength polyethylene although other materials are suitable. Extruding techniques are utilized to initially shape the tubing by forcing the molten thermoplastic material through an annular orifice, as is well known. The newly formed plastic tube is then subjected to negative or positive air pressure for reshaping the tube to form the corrugations.

As shown in the drawing, a pair of spaced apart recesses 18 are provided in one annular peak 12 of each group of a predetermined number of adjacent peaks. In the embodiments of the invention illustrated in the drawing, a pair of recesses 18 are located in one annular peak 12 of each group of twelve adjacent peaks. Each recess 18 is formed by a break or broken-away portion in the peak in which the recess is located. The peaks in which the recesses are located are closed at the recesses by transverse peak end walls, as clearly shown in the drawing. Each recess has a bottom 20 which is contiguous with the valleys 14 opposite the peak 12 in which the recess is located. This particular arrangement provides a recessed area having a longitudinal dimension which is equal to the width of two valleys and the width of one peak. A circular opening 22 is located in the bottom 20 of each recess 18. The openings provide communication between the interior and exterior of the tubing.

The recesses 18 in every 12th peak of the embodiment of the tubing shown in the drawing are spaced apart 120°. In the event three recesses are provided in every 12th annular peak, they may be also spaced 120° apart. Each opening extends into the valleys 14 opposite the peak having the recess.

The flexible corrugated tubing of the present invention is particularly useful in applications where building or other codes require large openings for drainage purposes or for flow of fluids from inside to outside the tubing. For strength and flexibility, the corrugations must not exceed a maximum longitudinal dimension or width. In applications where the openings must be larger than the width of the peak or valley forming the corrugations of the tube, it becomes necessary to provide areas on the tube in which these openings may be located. The recesses 18 of the present invention enables large openings to be cut or otherwise formed in the tubing without sacrificing strength or flexibility. Although the openings may be formed in the tubing during the molding operation it is usually more convenient to cut them by means of a drilling rig after the tubing is formed. In many instances it is necessary that the opening 22 be recessed from the exterior surface of the tubing. Without the recesses 18 it is impossible to meet this requirement in cases where the width of the individual peaks and valleys is smaller than the minimum dimension of the openings provided in the tubing.

What is claimed is:

1. A flexible corrugated tube having alternating substantially flat annular peak portions and substantially flat annular valley portions, walls interconnecting the peak and valley portions, at least one recess in one of the peak portions having a bottom contiguous with the valley portions opposite that peak portion, peak end walls at the recess closing the peak portion in which the recess is located, and an opening in the recess for providing communication between the interior and exterior of the tube.

2. A flexible corrugated tube as in claim 1 wherein the opening is circular.

3. A flexible corrugated tube as in claim 2 wherein the opening extends into the valley portions opposite the peak portion having the recess.

4. A flexible corrugated tube as in claim 1 wherein one annular peak portion of each group of a predetermined number of adjacent peak portions has a pair of spaced apart recesses.

5. A flexible corrugated tube as in claim 4 wherein the recesses of each pair are spaced apart 120°.

6. A flexible corrugated tube as in claim 5 wherein each opening is circular.

7. A flexible corrugated tube as in claim 6 wherein each opening extends into the valley portions opposite the peak portion having the recesses.

* * * * *

Notice of Adverse Decision in Interference

In Interference No. 98,157 involving Patent No. 3,658,097, R. C. Martin and M. E. Sixt, CORRUGATED TUBING, final judgment adverse to the patentees was rendered July 8, 1974, as to claims 1-7.

[*Official Gazette November 12, 1974.*]